United States Patent [19]

Usdan

[11] Patent Number: 4,593,157

[45] Date of Patent: Jun. 3, 1986

[54] DIRECTORY INTERFACE AND DIALER

[76] Inventor: Myron S. Usdan, 27 N. Main St., Chalfont, Pa. 18914

[21] Appl. No.: 646,839

[22] Filed: Sep. 4, 1984

[51] Int. Cl.[4] .................................................. H04M 1/26
[52] U.S. Cl. .............................. 179/90 BD; 179/90 D
[58] Field of Search ........... 179/90 B, 90 BB, 90 BD, 179/6.3 R, 7 R, 7.1 R, 6.02, 6.14, 6.18, 5 P, 27 FG, 27 FH

[56] References Cited

U.S. PATENT DOCUMENTS

| | | | |
|---|---|---|---|
| 3,928,724 | 12/1975 | Byram et al. | 381/43 |
| 4,314,108 | 2/1982 | Sharvit | 179/90 D |
| 4,348,550 | 9/1982 | Pirz et al. | 179/90 B |
| 4,413,158 | 11/1983 | Danford | 179/90 BD |
| 4,425,480 | 1/1984 | Lischin | 179/90 D |
| 4,443,664 | 4/1984 | Gange | 179/5.5 |

FOREIGN PATENT DOCUMENTS

| | | | |
|---|---|---|---|
| 41195 | 12/1981 | European Pat. Off. | 179/2 EC |
| 2938590 | 4/1981 | Fed. Rep. of Germany | 179/6.3 R |
| 750753 | 7/1980 | U.S.S.R. | 179/90 B |

OTHER PUBLICATIONS

Rabiner et al., "Application of Isolated Word Recogni- Signal Processing, Denver, Colo., USA, Apr. 9-11, 1980, *I Cassp 80 Proceedings*, pp. 182-185.
*I Cassp 80 Proceedings*, pp. 182-185.
Blomberg et al., "Let Your Voice do the Dialing", Telephony, May 2, 1983, pp. 68-74.

*Primary Examiner*—Gene Z. Rubinson
*Assistant Examiner*—Robert G. Lev
*Attorney, Agent, or Firm*—Gregory J. Gore

[57] ABSTRACT

Computer-aided speech-recognition circuitry is incorporated in a telephone receiver and programmed to recognize utterances given in response to a request for directory assistance. The information number given is displayed on the face of the receiver and stored for dialing out. An automatic dial out feature is included. The system is dormant until activated by a digit recognition circuit which samples all outgoing numbers dialed and is responsive to the 555-1212 digit sequence or any other digit sequence desired.

6 Claims, 2 Drawing Figures

DIRECTORY ASSISTANCE DISPLAY & DIALER

DIRECTORY ASSISTANCE DISPLAY & DIALER

DIRECTORY INTERFACE AND DIALER

FIELD OF THE INVENTION

This invention relates to speech recognition, information display and automatic dialing associated with telephones.

BACKGROUND OF THE INVENTION

With the increase in information processing, certain telephone operator functions are ever increasingly being displaced by electronic devices. One of these areas is in directory assistance. For example, there is a present shift toward the use of computer aided synthesized speech output devices to assist telephone operators in answering calls for directory assistance. It is conceivable and, in fact, highly probable that this soon will replace entirely the use of telephone directories. Presently, with the use of operator directory assistance, there is the need for storage and display of the correct dialing number requested. This is often achieved by the caller simply writing down the number provided by the operator or the computer and then after hanging up, redialing this number manually. The instant invention is intended to reduce the user effort in obtaining directory assistance numbers and redialing them. This invention may be applied to any telephone receiver but presently has its most useful application to public pay telephones where most often the user is not prepared with paper and a writing instrument to record and preserve the correct number given by the operator. In the future, as printed telephone directories become obsolete and all directory assistance is handled over the telephone receiver, the instant invention will be a very handy, time-saving device and will also prevent much incorrect dialing. As an auxiliary feature of the instant invention, the storage display and dial-out mode is provided so that prior to dialing, each number is first displayed and then stored before dialing is initiated. The dialing then is initiated by a separate electrical signal operated by a separate switch device on the telephone receiver.

PRIOR ART

There has been much activity recently in the area of telephone electronics, both with the expanding technology of computers and the reduced cost of computer components. In addition, the de-regulation of telephone hardware has allowed increased competition and many new equipment manufacturers to enter the market. The field is replete with numerous number storage automatic dialing telephone and telephone accessories. However, none has addressed the problem of public directory assistance to which the instant invention refers. Private directories and computer storage equipment therefore are very commonplace. However, there is need to interface some of the characteristics with these systems to the public directory assistance information network.

Although the various electronic components required to construct such a system are widely explained in detail both in previously issued United States patents and technical publications in the field of electronic communications, these components have not been so arranged to affect the result and address the problem which is solved by the instant invention. For example, U.S. Pat. No. 4,341,929 to Alexander, et al, issued on July 27, 1982, describes the common memory accessing system to be used with the standard telephone receiver. With such a system a memory file is created by the private user wherein numbers associated with a data word are filed to be called up by user when required and automatically dialed by the electronic device. The instant invention works on much the same principles and may use many of the same electronic components but is arranged in such a fashion that the device now accesses the public directory assistance data system as its file base rather than just the specific numbers which have been programed into the computer for private everyday use.

As part of the instant invention which allows it to access the directory assistance data base, a speech recognition system is employed as the communications link. There are many examples of speech recognition systems in the prior art including, but not limited to, the U.S. patent to Pirz, et al, issued on Dec. 31, 1981 which describes a multiple template speech recognition system to be used in conjunction with a telephone receiver. Similarly, U.S. Pat. No. 4,348,550 also to Pirz, et al, on Sept. 7, 1982, describes a speech controlled dialing circuit which identifies input utterances of the user as a command input to initiate dialing. This concept is similar to that of the instant invention, however, it uses a fixed private data base as its directory store and contains no access link to public directory assistance.

SUMMARY OF THE INVENTION

This invention is the simple combination of computerized electronic components which will permit the use of a telephone receiver as heretofore described herein. The basic components are a speech recognition circuit, a storage capacity, a display capacity, and an automatic dial function. The key element to this system is a speech recognition element which is programmed to recognize as useful utterances those utterances which are synthesized by computer and responsive to callers requests for directory assistance. Since the numeric utterances are becoming standardized and since the recognition number of digits need only be ten, such a speech recognition element need only be one of a simple and relatively inexpensive design.

A numeric display element is associated with the speech recognition element to display the number recognized in a visual form. The display element has its own memory system whereby the number is continuously displayed until erased by the user. Another element of the instant invention is a dial-out element which when actuated, dials the number displayed on the numeric display.

Accordingly, it is the primary object of the instant invention to provide a telephone receiver which can interface with the public directory assistance system to retrieve and store information therefrom.

It is another object of the instant invention to automatically dial information retrieved from the public directory assistance system.

It is a further object of the instant invention to create a visual display of the proper dialing number provided by public directory assistance by the use of a computer aided speech recognition system.

DESCRIPTION OF THE PREFERRED EMBODIMENT AND ITS OPERATION

Although the inventor has not reduced to practice his invention disclosed herein all of the components necessary in constructing his invention are well-known to those of ordinary skill in the art. All of these components have been referred to and are fully described in the prior art to Alexander, and Pirz et al incorporated by reference into this application.

Figure 1:
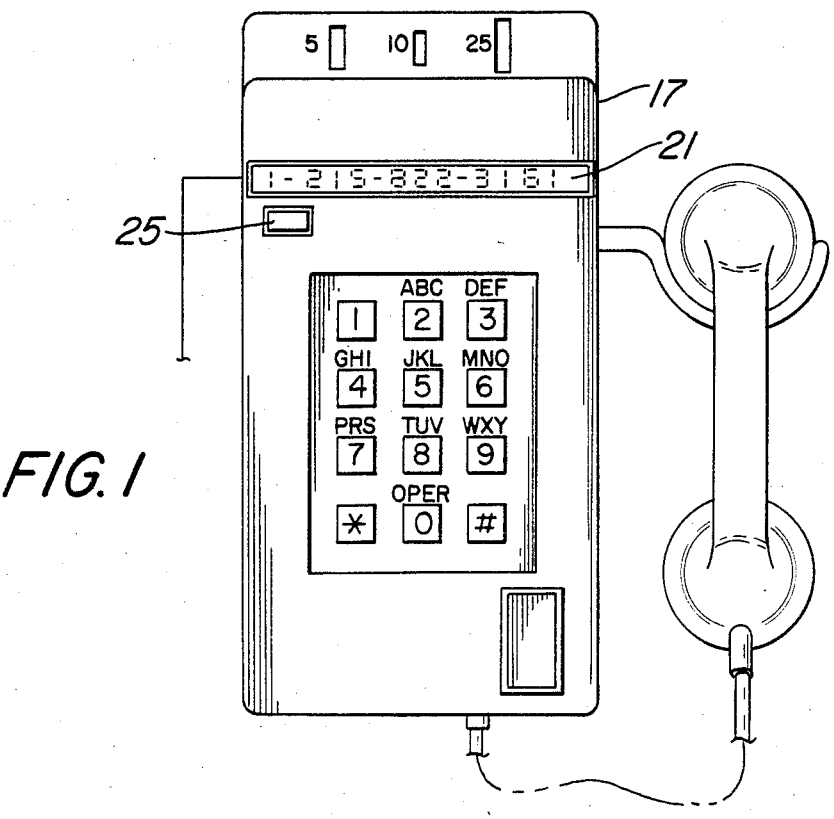
FIG. 1 is a front view of a telephone receiver equipped with the various features of applicant's invention.
Figure 2:
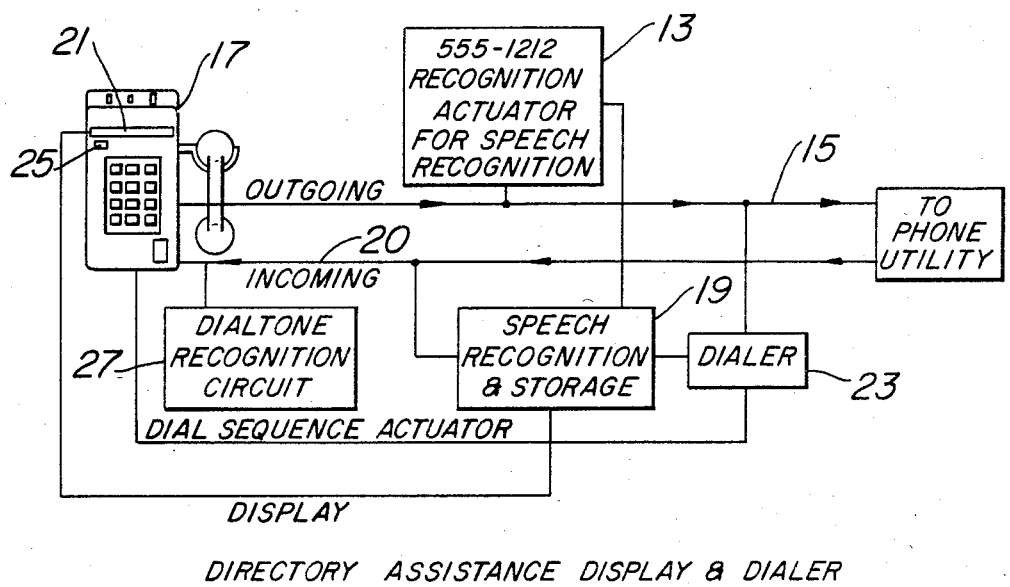
FIG. 2 is a schematic diagram of the instant invention as conceived by the inventor.

FIG. 2 shows the arrangement of the various components necessary to carry out the invention. Speech recognition circuit activator 13 is connected to the output line 15 of the phone receiver 17. This circuit 13 samples all output signals and is responsive only to the frequency pulses associated with the information call number 555-1212 regardless of whether it occurs with a three-digit area code preceding it. The activator circuit 13 then activates the speech recognition circuit 19 which samples all incoming signals from line 20 coming into the phone receiver 17. The speech recognition circuitry 19 is programed to recognize the standardized computer synthesized speech utterances commonly used to communicate the requested number to the user. As the individual digits are recognized, they are stored in sequence and displayed on display element 21. U.S. Pat. No. 4,090,037 to Benjamin et al which is incorporated herein by reference describes a numeric display system which can be used as part of the instant invention. A dialing circuit 23 initiated by dialing activator 25 then may repeat the stored sequence of digits as an output signal from the phone receiver 17. U.S. Pat. No. 4,243,845 to Feinburg et al which is hereby incorporated herein by reference describes such a repatory dialing device which may be used as part of the instant invention. The signal to dial is connected to a dialtone recognition circuit 27 associated with the phone receiver so that the dial-out function will only occur after the phone receiver has been hung up and then a dialtone recognized. The signal to dial which is preferrably initiated by a touch button, also acts as a re-dial as the storage capacity in the speech recognition and display circuitry is designed to either retain the stored number for a set time or until erased by the user. Either option may be designed into the system.

As described above, the instant invention operates to access a utility directory assistance information as conceived by the inventor. It should be understood, however, that there may be many variations, modifications and adaptations which are apparent to those skilled in the art which fall within the spirit and scope of the instant invention as disclosed herein which is meant to be but one embodiment of the invention defined by the appended claims and their legal equivalents.

What is claimed is:

1. An information recognition display and dialer for a phone receiver having input and output lines, comprising:
   a. a speech recognition and storage means connected to the input lines of said phone receiver;
   b. an activator circuit connected to said speech recognition and storage means responsive to a digit sequence connected to the output line of said phone receiver for activating said speech recognition and storage means;
   c. a numeric display means connected to said speech recognition and storage means for displaying the digits recognized and stored in said recognition and storage means;
   d. dialer means connected to said speech recognition and storage means and to the output lines of said phone receiver for delivering dialing pulses to the output lines of said phone receiver corresponding to the digits recognized and stored in said speech recognition and storage means;
   e. a dialer activator located on said phone receiver connected to said dialer means for initiating a dial-out function;
   f. a dialtone recognition circuit connected to said phone receiver and said dialer activator which prevents the dialer activator from activating said dialer until a dialtone is recognized.

2. The information recognition display and dialer described in claim 1 wherein the phone receiver is a public, pay telephone.

3. The information recognition display and dialer described in claim 1 wherein the activator is responsive to the digit sequence 555-1212.

4. The information recognition display and dialer described in claim 3 wherein the dialer activator is a touch operated button.

5. A phone receiver having input and output lines, comprising;
   a. a speech recognition and storage means connected to the input lines of said phone receiver;
   b. an activator circuit connected to said speech recognition and storage means responsive to a digit sequence connected to the output line of said phone receiver for activating said speech recognition and storage means;
   c. a numeric display means connected to said speech recognition and storage means for displaying the digits recognized and stored in said recognition and storage means;
   d. dialer means connected to said speech recognition and storage means and to the output lines of said phone receiver for delivering dialing pulses to the output lines of said phone receiver corresponding to the digits recognized and stored in said speech recognition and storage means.

6. The phone receiver of claim 5 further including a dialer activator located on said phone receiver connected to said dialer means for initiating a dialout function.

* * * * *